Sept. 5, 1967  R. A. PEARSON  3,339,467
MACHINE FOR SETTING UP OPEN ENDED CARTONS
Filed March 29, 1965  11 Sheets-Sheet 2

INVENTOR.
REINHOLD A. PEARSON
BY
ATTYS.

Sept. 5, 1967  R. A. PEARSON  3,339,467
MACHINE FOR SETTING UP OPEN ENDED CARTONS
Filed March 29, 1965  11 Sheets-Sheet 3
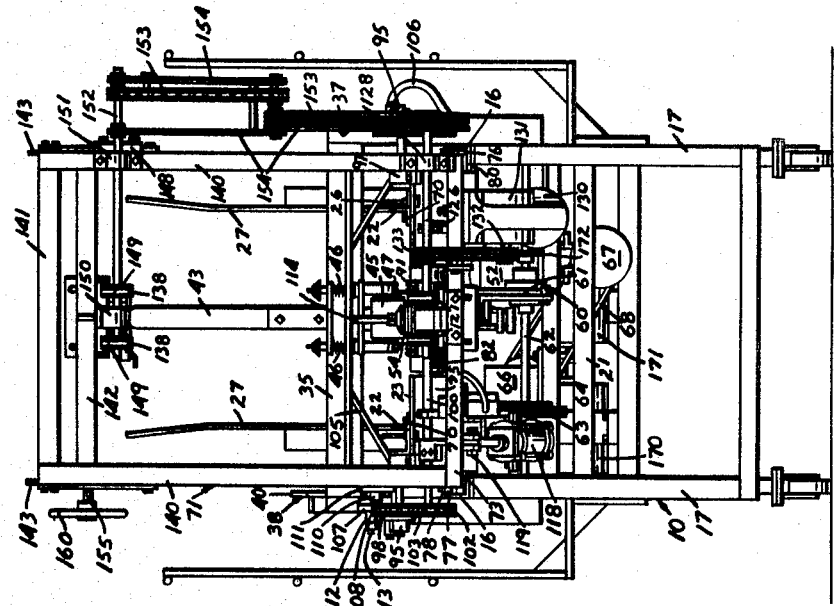
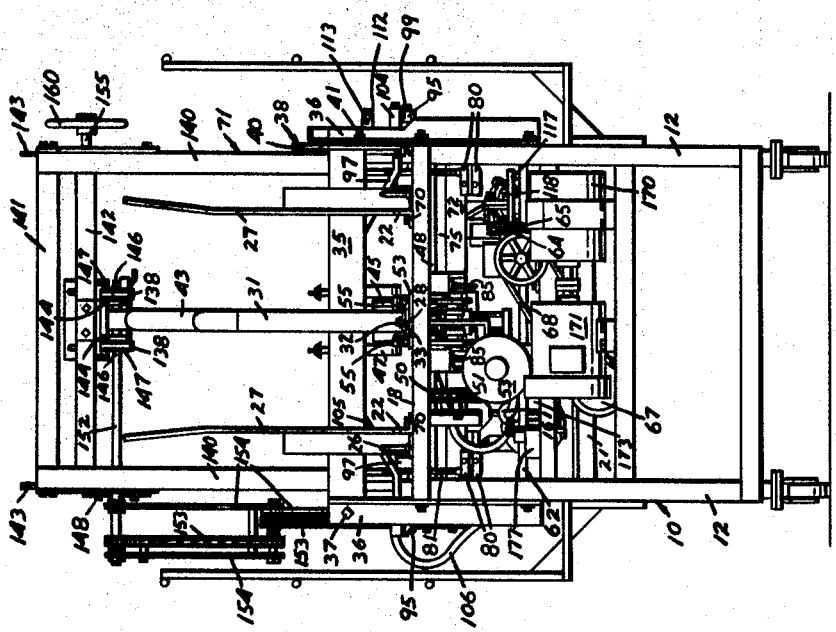
INVENTOR.
REINHOLD A. PEARSON
ATTYS.

Sept. 5, 1967 R. A. PEARSON 3,339,467
MACHINE FOR SETTING UP OPEN ENDED CARTONS
Filed March 29, 1965 11 Sheets-Sheet 4

Fig. 5

INVENTOR.
REINHOLD A. PEARSON
BY *Wells & St.John*
ATTYS.

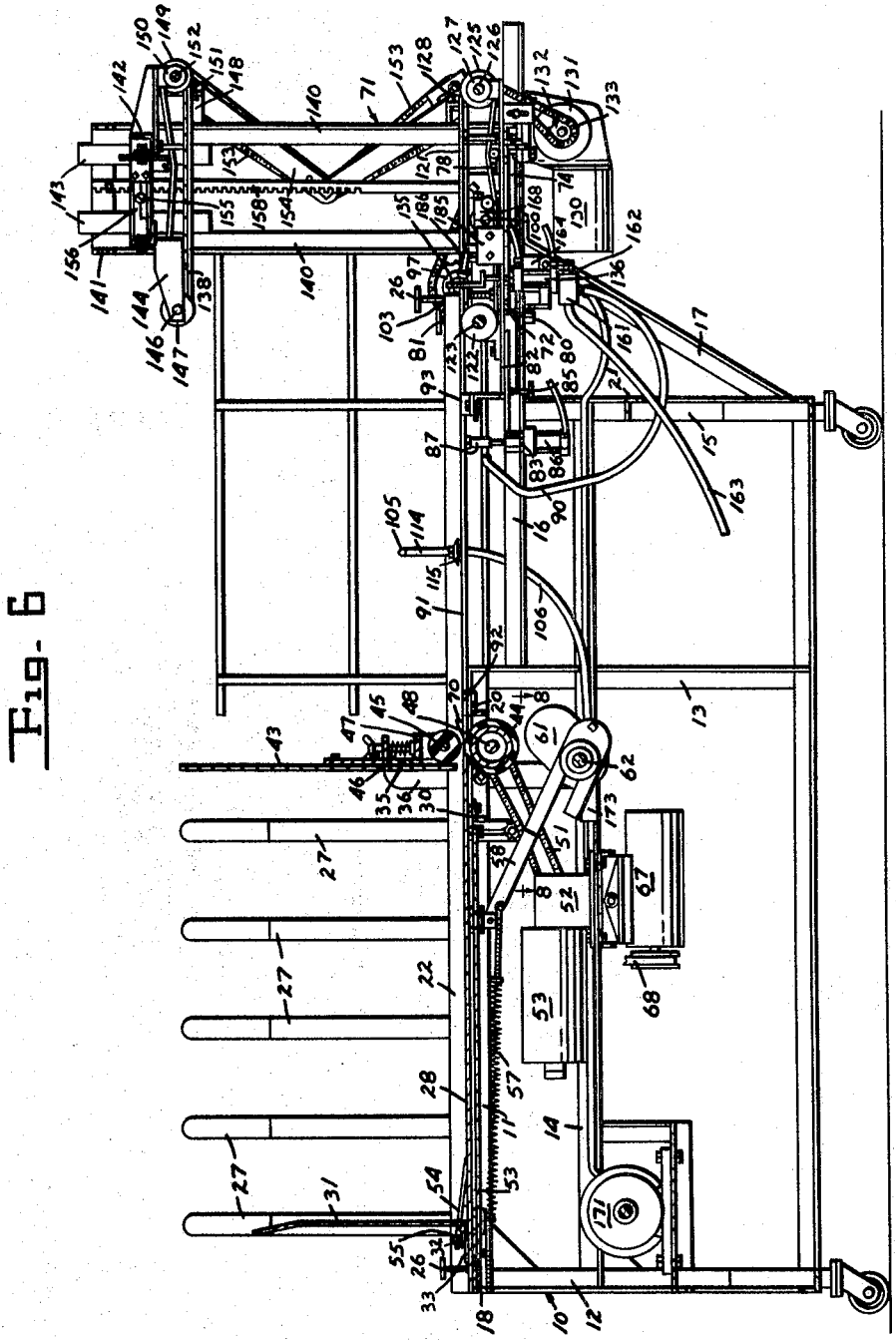

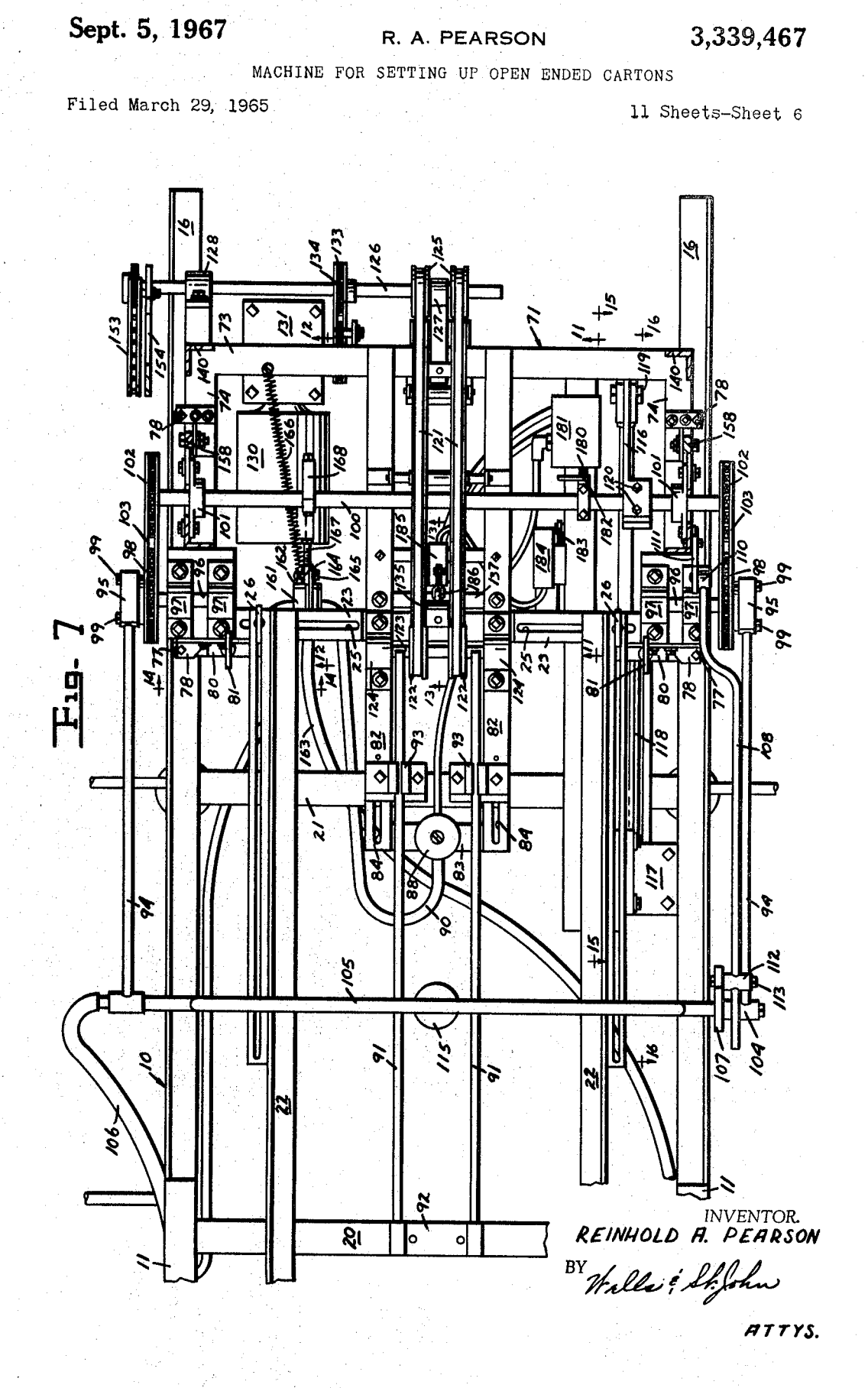

Sept. 5, 1967  R. A. PEARSON  3,339,467
MACHINE FOR SETTING UP OPEN ENDED CARTONS
Filed March 29, 1965  11 Sheets-Sheet 7
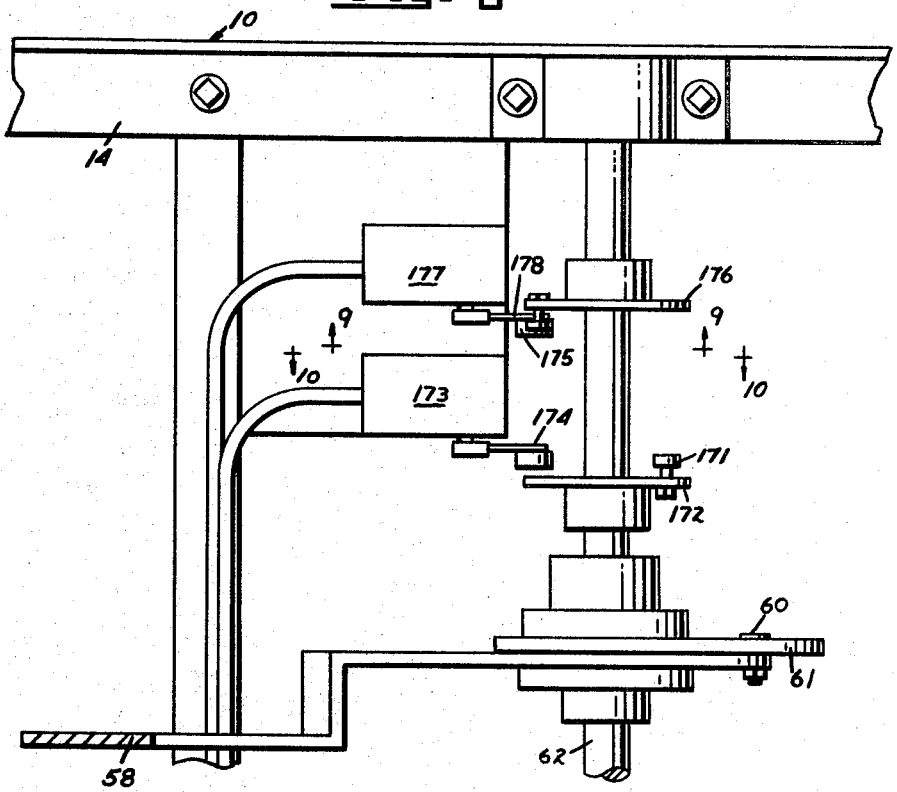
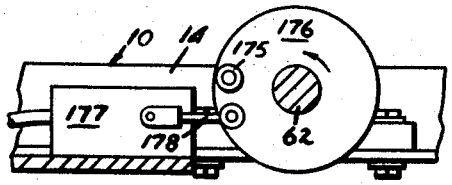
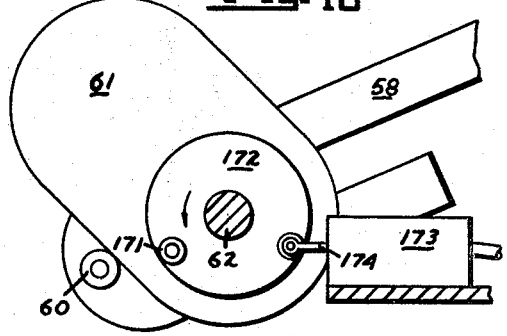
INVENTOR.
REINHOLD A. PEARSON
BY Wells & St. John
ATTYS.

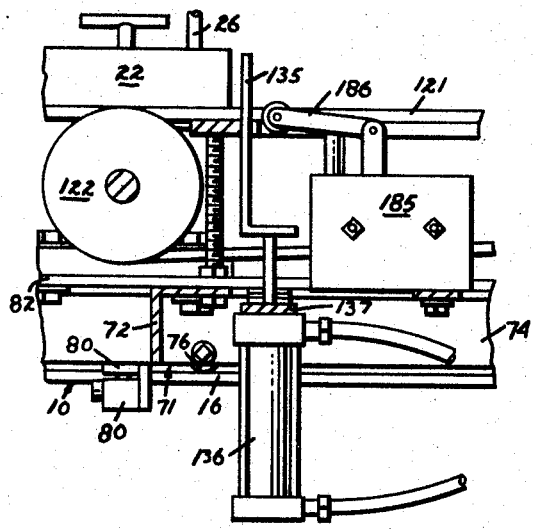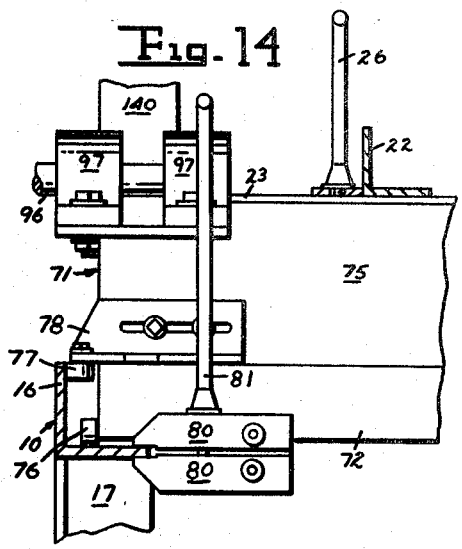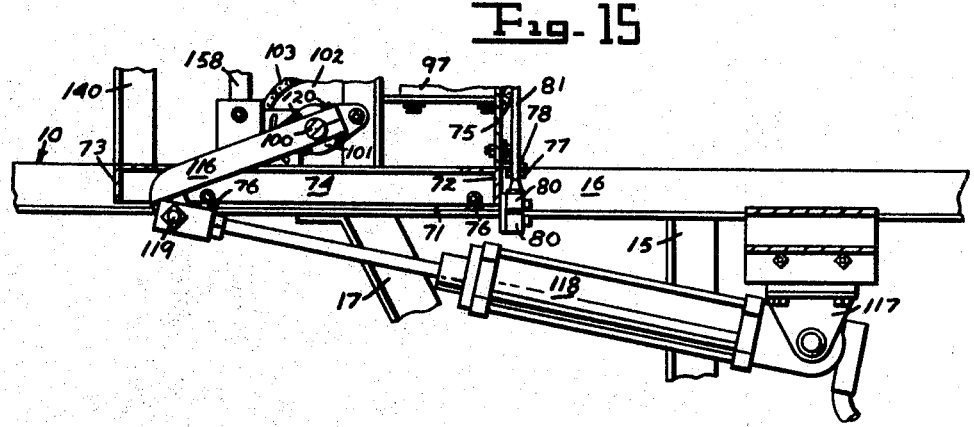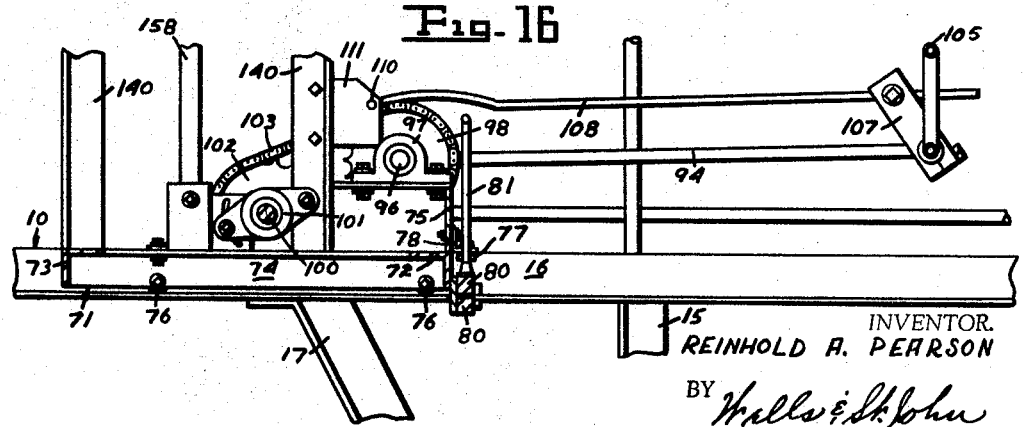

Sept. 5, 1967 R. A. PEARSON 3,339,467
MACHINE FOR SETTING UP OPEN ENDED CARTONS
Filed March 29, 1965 11 Sheets-Sheet 10

INVENTOR.
REINHOLD A. PEARSON
BY *Wells & St.John*
ATTYS.

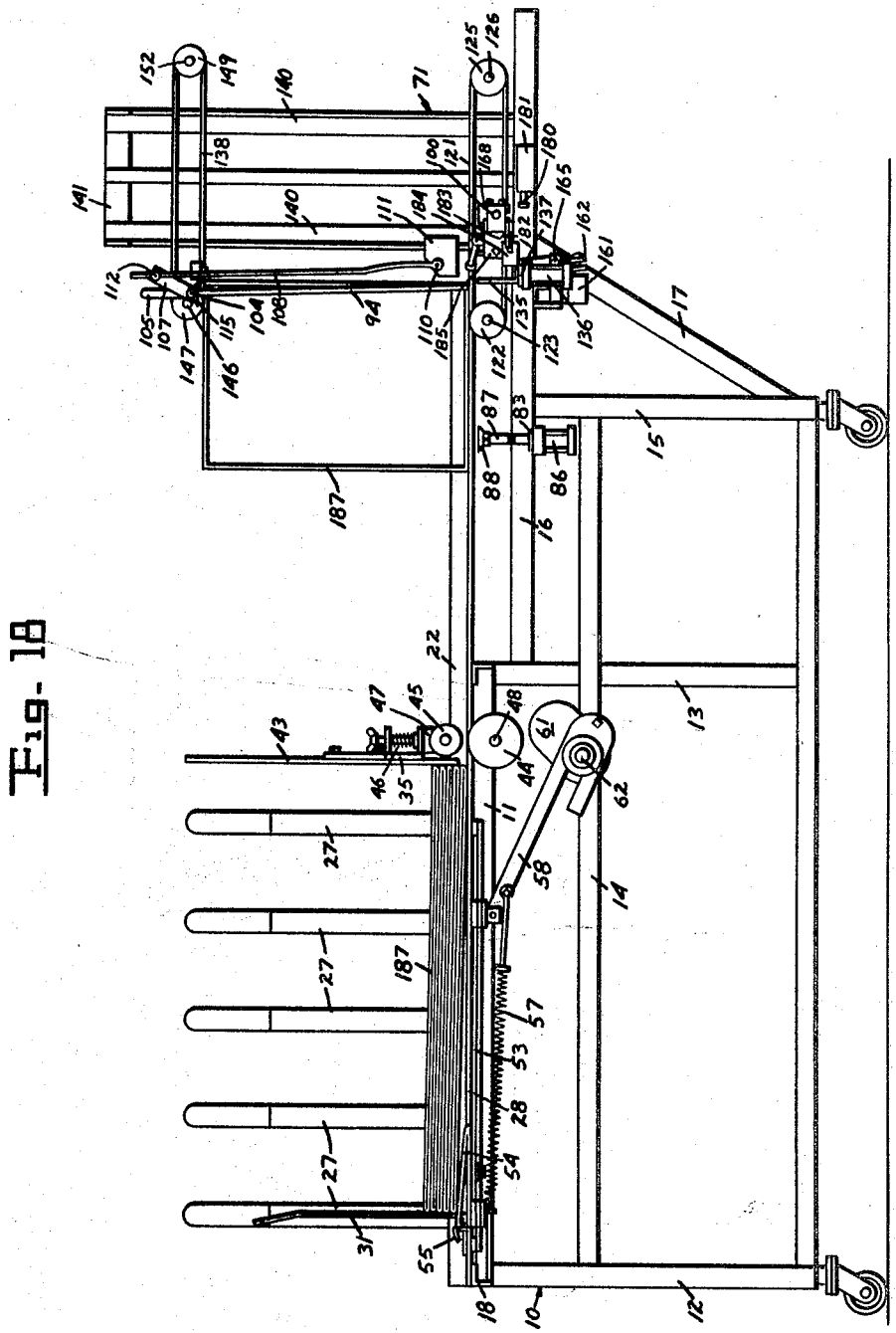

United States Patent Office 3,339,467
Patented Sept. 5, 1967

3,339,467
MACHINE FOR SETTING UP OPEN ENDED
CARTONS
Reinhold A. Pearson, E. 304 2nd Ave.,
Spokane, Wash. 99202
Filed Mar. 29, 1965, Ser. No. 443,295
11 Claims. (Cl. 93—53)

This invention relates to a novel machine for setting up open ended cartons.

The present invention is designed to feed cartons into a machine that closes the flaps at one carton end. The apparatus feeds collapsed carton blanks from a storage hopper, expanding each blank to a rectangular open configuration and maintaining it in such configuration during delivery to a subsequent machine.

It is a first object of this invention to provide a machine having the required mechanism to open collapsed carton blanks and feed them to a station at which they are set up in a rectangular configuration for delivery to a conveyor apparatus that maintains the required rectangular carton configuration while delivering the open carton.

Another object of this invention is to provide an apparatus that is fully adjustable for any conventional size or shape of rectangular cartons.

Another object of this invention is to provide such a machine that can feed a blank of any length to the carton setting up mechanism so that the operation can be accomplished in the same timed relationship regardless of carton size.

Another object of this invention is to provide a machine having positively actuated devices for locating and handling the cartons so that the devices can all be timed from a common source and operated at a high rate of speed without danger of malfunction or damage to cartons.

Another object of this invention is to provide an apparatus wherein the mechanism that expands the cartons also bring it into contact with the delivery conveyor mechanism.

These and further objects will be evident from the following disclosure, taken together with the accompanying drawings, which illustrate a preferred form of the invention. It is to be understood that this form of the invention is only exemplary and that other equivalent structures could be substituted in place of those shown.

In the drawings:

FIGURE 3 is an end view of the apparatus as seen from the left in FIGURE 1;

FIGURE 4 is an end view of the apparatus as seen from the right in FIGURE 1;

FIGURE 5 is a top view of the apparatus as shown in FIGURE 1;

FIGURE 6 is a longitudinal sectional view of the apparatus as seen along line 6—6 in FIGURE 5;

FIGURE 7 is an enlarged fragmentary section of the machine as seen along line 7—7 in FIGURE 1;

FIGURE 8 is an enlarged fragmentary sectional view taken along line 8—8 in FIGURE 6;

FIGURE 9 is a fragmentary view taken along line 9—9 in FIGURE 8;

FIGURE 10 is a fragmentary view taken along line 10—10 in FIGURE 8;

FIGURE 13 is an enlarged fragmentary sectional view taken along line 13—13 in FIGURE 7;

FIGURE 14 is an enlarged fragmentary sectional view taken along line 14—14 in FIGURE 7;

FIGURE 15 is a fragmentary sectional view taken along line 15—15 in FIGURE 7;

FIGURE 16 is a fragmentary sectional view taken along line 16—16 in FIGURE 7;

FIGURE 17 is a schematic view similar to FIGURE 6, showing the expansion of a carton during opeartion of the machine; and FIGURE 18 is a view similar to FIGURE 17, showing a carton immediately after release by the carton expanding mechanism.

General decsription

Figure 1:
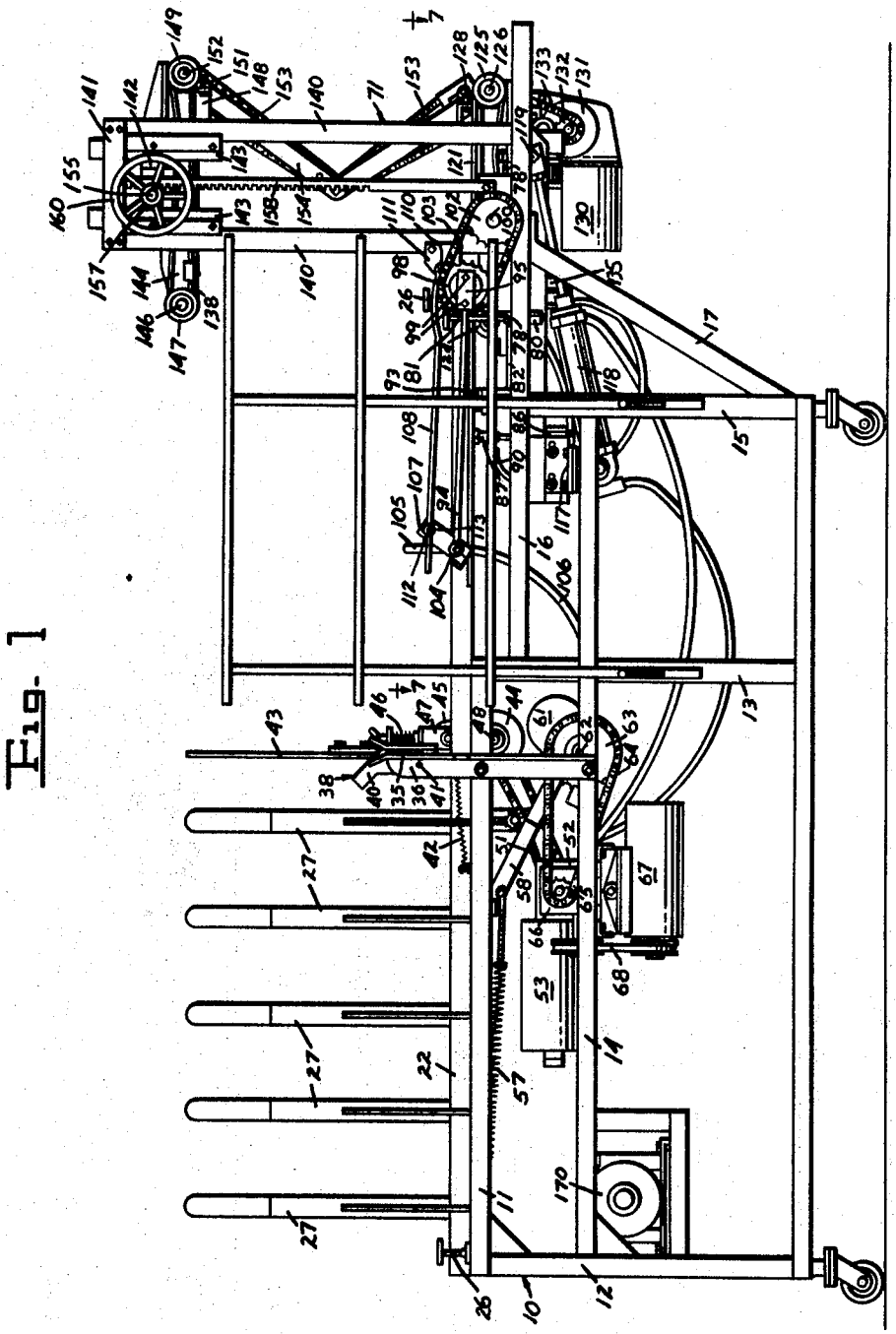
FIGURE 1 is a side elevation view of the machine for setting up open ended cartons.

This apparatus is concerned with the handling and expanding of collapsed carton blanks that are open at each end. The flaps at the open ends of the cartons are normally folded to a closed condition, the flaps being eventually sealed or fixed in a closed condition after filling of the carton. The present machine is basically a machine to feed open cartons to another machine that will in turn manipulate the flaps in the desired fashion. The apparatus described below mechanically performs the opening of the carton blanks, which has previously been accomplished by manual means.

The machine has three basic areas of mechanical structure, each performing a separate function in an interrelated fashion relative to the functions of the other. First is the storage and feeding mechanism which stores a stack of collapsed cartons and feeds each carton blank individually to a station at which it is expanded. The expansion mechanism grasps each carton blank located at the required station on the supporting framework and mechanically expands it to an open rectangular configuration with the carton walls perpendicular to one another. The carton expansion mechanism in turn places each expanded carton between a pair of spaced belt flights on the supporting framework that frictionally engage opposite outer carton surfaces. This delivery conveyor mechanism carries the carton from the machine while retaining its rectangular configuration. The three basic mechanisms are operated in a timed sequence and the mechanical devices that manipulate the cartons are all adjustable to accommodate cartons of various sizes.

The basic rigid framework 10 on which the cartons are handled is best seen in FIGURES 1 through 6. The framework 10 is common to all three areas of mechanism. It includes a pair of parallel upper longitudinal members 11 extending from the rear of the machine (to the left in FIGURE 1), where they are supported on rear posts 12, to the center of the machine, where they are supported on center posts 13. Below the longitudinal members 11 at each side of the machine are located longitudinal braces 14 which also are supported on posts 12 and 13, and which extend forwardly to a front post 15 at each side of the apparatus. A front longitudinal member 16 is located intermediate the elevations of the member 11 and brace 14 at each side of the machine and protrudes forwardly from center post 13 and front post 15, being further supported by an angular brace 17. The members just described are suitably braced, as shown in the drawings. The bracing includes a rear transverse brace 18 fixed across the rear ends of the two upper longitudinal members 11, a center transverse brace 20 fixed across the upper ends of the center posts 13 and a flat transverse brace 21 (FIGURE 6) fixed between the front posts 15. The framework members described are fastened to one another to present a rigid supporting framework for the mechanisms of the machine. In addition, the front longitudinal members 16 serve as guide and supporting members for the carton expansion mechanism and the carton delivery mechanism which are both adjustably mounted on the framework relative to the remainder of the machine.

Carton storage and feed mechanism

The storage and feeding mechanism illustrated in the drawings can best be understood from FIGURES 5 and 6. This section of the machine is located to the left in both of these figures. Its purpose is to store a stack of collapsed carton blanks in preparation for expansion by the machine to an erected or rectangular configuration. Each carton is fed individually from the storage hopper in which the stack of carton blanks is maintained.

The carton blanks are basically supported for longitudinal motion along the length of the framework on a pair of transversely spaced longitudinal carton guides 22. Each guide 22 is made of an inwardly facing angle iron having an upwardly protruding flange utilized as a side guide for the carton blanks and a horizontal flange used to support the lower surfaces of the banks adjacent to the respective side edges thereof. Each longitudinal guide 22 is supported by the rear transverse brace 18 and also by a transverse brace 23 that is part of the front carriage described below. The rear brace 18 is provided with a transverse slot 24 at each of its respective ends. Brace 23 is similarly slotted at 25. The guides 22 are selectively fixed relative to the braces 18 and 23 by clamps 26 that are received in the respective slots 24 and 25 (FIGURE 5). Therefore, the lateral spacing between the guides 22 can be selected to match the width of the carton blanks being handled by the machine.

The storage hopper is bounded by a plurality of side uprights 27 fixed to the upstanding flange of each longitudinal guide 22. The uprights 27 form vertical extensions of the upright flange so as to position cartons located between the uprights 27 for reception on the longitudinal guides 22. A center plate 28 is located in a horizontal position and supported between the rear brace 18 and intermediate transverse brace 30 fixed between the upper longitudinal members 11 of the basic framework 10. The center plate 28 provides central support for the carton blanks in the storage hopper and supports a rear upright 31 that locates the rear edges of blanks stacked in the hopper. The rear upright 31 is fixed relative to the center plate 28 by a releasable bolt 32 adjustably received within a slot 33 at the base of upright 31. The bolt 32 can be received within any one of several apertures 34 formed in the center plate 28 at spaced distances such that the rear upright 31 can be adjustably mounted at any desired location longitudinally along the length of the center plate 28.

At the front of the hopper is located a transverse vertical wall 35 that is mounted between upright side brackets 36 fixed to the longitudinal members 11 and braces 14 at each side of the machine. The wall 35 is pivotally carried by the bracket shown at the top of FIGURE 5 by means of a bolt 37. It is releasably clamped at the side of the machine shown at the bottom in FIGURE 5 between parallel plates and is held in place by a releasable latch 38 pivoted to the bracket 36 at 41. The latch 38 has a handle 40 by which its upper end can be pivoted rearwardly to free the upper end of the wall 35. The latch 38 is biased to its normal position in engagement with the upper end of wall 35 by a tension spring 42 that extends rearwardly to a connection on the upper longitudinal member 11 (FIGURE 5). At the center of the vertical wall 35 is a front upright 43 that forms a vertical extension of the wall 35 and serves as a forward blocking member to locate the required stack of collapsed cartons in the storage hopper.

The feed mechanism basically comprises a pair of rolls that frictionally engage the forward end of each collapsed carton and push the carton forward along the supporting framework to a station at which it is located and expanded. Individual cartons are fed between the rolls by a reciprocating apparatus that engages only the bottom carton blank in the stored stack.

As can be seen in FIGURE 6, a grooved power roll 44 is carried on a supporting shaft 48 suitably journalled by the framework 10 for rotation about a transverse horizontal axis. A spaced upper roll 45 is carried on brackets 47 by the vertical wall 35. The brackets 47 are biased downwardly by compression springs 46 and are adjustable vertically relative to the wall 35. The two rolls 44 and 45 respectively engage the lower and upper surfaces of each carton blank passing beneath the fixed wall 35.

The lower roll 44 is rotated to propel carton blanks engaged thereby in a forward direction. Power for the shaft 48 is received through a sprocket 50 (FIGURE 2) that is turned by a chain 51 powered by the output of a variable speed transmission 52 and motor 53. It is to be noted that the power unit for the grooved roll 44 is entirely independent of all other powered mechanisms on the machine.

The reciprocating mechanism by which individual blanks are released from the storage hopper can best be understood from FIGURE 6. The lower extension of the forward upright 43 prevents forward movement of all but the lowermost carton in the stack of cartons stored between the uprights 27, 31 and 43. The lowermost carton can pass beneath the upright 43. Reciprocation of the lower carton blank is accomplished by a longitudinal plate 53 that is slidably guided on center plate 28. The plate 53 carries a protruding tapered member 54 at each side of the center plate 28. At the rear end of the tapered member 54 is an upstanding rear ledge 55 having the approximate thickness of one carton blank. Ledge 55 is adapted to engage the rear edge of the lowermost blank in the stack between the upright and to push forwardly on that blank alone thereby causing it to be fed between the two rolls 44 and 45. A slot 56 is formed along one side of the plate 53 for adjustable positioning of the member 54 to accommodate cartons of various lengths.

Plate 53 is reciprocated longitudinally relative to the center plate 28 by means of a vertical connecting link 58 that leads forwardly from its connection to plate 53 (FIGURE 6) to surround a main cross shaft 62 on the framework 10. The connecting link 58 carries a cam follower 60 (FIGURES 8 and 10) that engages the outer periphery of a cam 61 fixed to shaft 62. The cam follower 60 is held against the periphery of cam 61 by a tension spring 57 connected between the upper end of connecting link 58 and the rear of the machine (FIGURE 6). The cam 61 has an oval configuration with the shaft 62 centered radially at one end thereof, so that each revolution of the cam 61 will pull the plate 53 forwardly and then return it to its rear position as illustrated in the drawings, where it will remain stationary until again pulled forward by continued rotation of cam 61.

The main cross shaft 62, from which the timing for the various mechanisms described below is derived, is suitably journalled on the members of the framework 10. It is rotated constantly by a sprocket 63 fixed to it (FIGURE 1) and turned by means of a chain 64 powered by the outlet sprocket 65 of a transmission 66 mounted on the framework 10. The transmission 66 is powered by a motor 67 through a belt drive connection 68.

After passing between the rolls 44, 45, the carton blanks are prevented from moving rearwardly by tapered stops 70 adjustably fixed to each longitudinal carton guide 22. The rear surface of each stop 70 is tapered so that forwardly moving blanks can pass freely over it, but the front surface is vertical to prevent rearward movement of the carton blanks after the rear edge of each blank has passed beyond the stops 70. These stops 70 can be seen in FIGURES 5 and 6.

Carton expanding mechanism

The carton expanding mechanism, which erects the collapsed carton blanks, as well as the delivery mechanism 75 that delivers the erected blanks from the machine, is mounted on a movable carriage adjustably positioned relative to framework 10. In actual practice, the carriage remains stationary during use, but is movably adjustable to accommodate carton blanks of varying dimensions.

The movable carriage, generally designated by the numeral 71, can best be understood from a study of FIGURES 7 and 12 through 16. The entire carriage 71 is also shown in FIGURES 1 through 6. It also includes the supporting framework structure for the carton delivery mechanism that will be described below.

Figure 12:
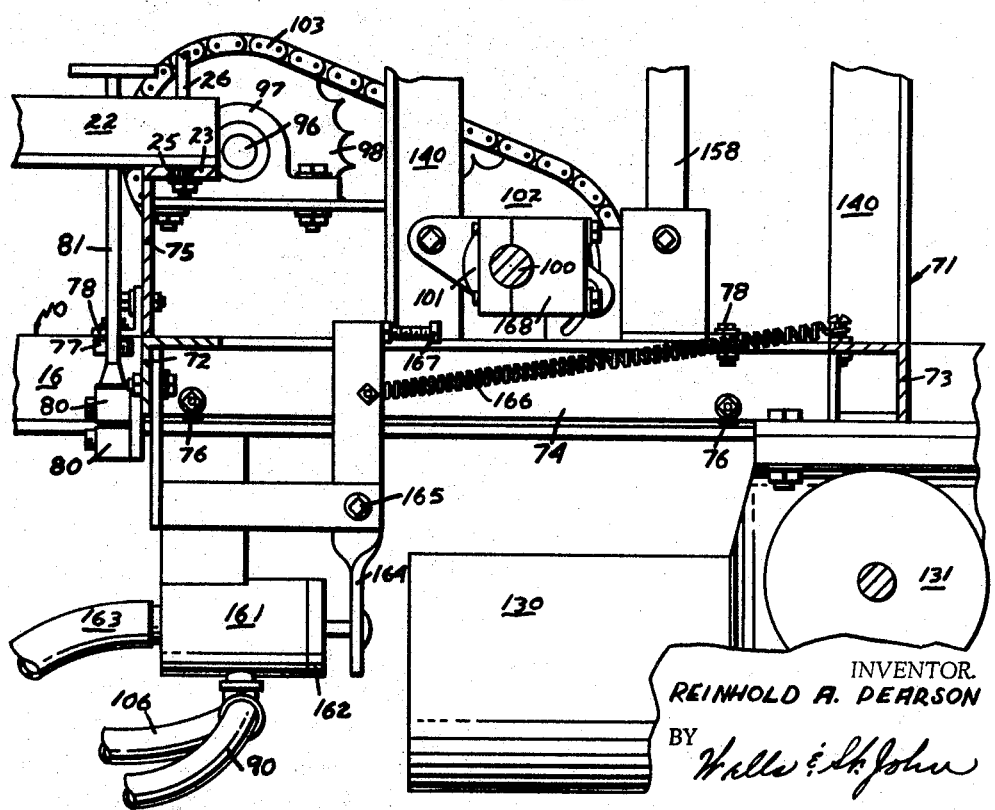
FIGURE 12 is an enlarged fragmentary sectional view taken along line 12—12 in FIGURE 7.

The basic support for the carriage 71 is a rigid horizontal rectangular frame that comprises a front transverse brace 72, a rear transverse brace 73 and connecting side members 74 (FIGURE 12). Extending upwardly from the front brace 72 is a vertical front wall 75 at the top of which is the previously described horizontal transverse brace 23.

The rectangular frame formed by braces 72, 73 and side members 74 is supported on the longitudinal member 16 by front and rear rollers 76 suitably journalled at the respective ends of the side members 74. The carriage is also located with respect to the framework 10 by rollers 77 mounted on bracket 78 protruding to the side of the front wall 75 (FIGURE 14). The rollers 76 engage the horizontal ledge of the longitudinal member 16, while the side rollers 77 engage the vertical flange of the same members 16. Therefore the two sets of rollers at each side of the horizontal frame permit it to be guided by the members 16 for longitudinal reciprocation relative to framework 10.

The carriage 71 is selectively fixed relative to the framework 10 by clamping members 80 (FIGURES 12, 14) that are selectively locked by manual handles 81. The clamping members 80 releasably engage the horizontal portions of the front longitudinal member 16 at each side of the machine and permit accurate placement of the carriage 71 relative to the framework 10.

In order to expand a carton, the bottom panel of the carton must be gripped at the same time that the top panel is gripped, the two being moved relative to one another to pivot the respective carton panels to the desired rectangular configuration. The apparatus utilized to grasp the bottom panel can best be understood from the showing of FIGURES 5, 6 and 7. A pair of rearwardly directed supports 82 are fixed to and project from the rear transverse brace 73 in the horizontal rectangular frame. A cylinder mounting bracket 83 extends rearwardly from the rear end of each support 82 and is adjustably located relative to the respective supports 82 by longitudinal slots 84 that receive manually operated clamping screws 85 (FIGURE 6). In this manner, the mounting bracket 83 can be adjusted longitudinally relative to the remainder of the carriage 71 to properly position the lower vacuum cup.

Extending from the bracket 83 is a vertical pneumatic cylinder assembly 86 including a short piston rod at the top of which is mounted a post 87 and an upwardly directed vacuum cup 88. The post 87 is hollow and in communication with the center of the vacuum cup 88, post 87 being connected to a source of vacuum by a hose 90.

To provide central support for the carton blanks as they are carried longitudinally along the framework 10, there are provided a pair of center support rods 91 whose top surfaces are in the same plane as the upper surfaces of the horizontal flanges of the longitudinal carton guides 22 at the side edges of the carton blanks. The rear ends of the respective rods 91 are fastened to the framework 10 by a bracket 92 on the center transverse brace 20. The rods 91 are supported adjacent their forward ends by slidable brackets 93 fixed to the rear end of the respective supports 82 on carriage 71. The brackets 93 slidably engage the lower and side surfaces of the respective rods 91, leaving the top surface of rods 91 clear and unobstructed so that they can provide a smooth supporting surface for sliding movement of carton blanks passing over them. This slidable support afforded by brackets 93 in no manner interferes with the necessary longitudinal movement of the carriage 71 relative to the supporting framework 10.

The top panel of the carton blank is engaged by a movable vacuum cup carried by an apparatus that is best seen in FIGURES 1, 2, 5, 7 and 16. It utilizes a pair of identical lever arms 94 having mounting blocks 95 fixed to their rear ends and fixed to stub shaft 96 rotatably journalled on the carriage 71 by suitable bearings 97. The shafts 96 are coaxial and mounted for rotation about a transverse axis on carriage 71.

The stub shafts 96 have fixed to them a pair of identical sprockets 98. The shafts 96 are turned by a chain 103 at each side of the machine entraned on respective sporckets 102 fixed to a transfer shaft 100. Shaft 100 is rotatably carried on the carriage 71 by bearings 101 (FIGURE 16). Therefore, pivotal motion of the cross shaft 100 will be transmitted by sprockets 102, chain 103 and sprockets 98 to each of the stub shafts 96 and will therefore pivot the lever arms 94 in unison.

At the forward end of each lever arm 94 is mounted a bearing 104 that journals a transverse tube 105. The end of tube 105 seen at the bottom of FIGURE 7 is closed while its opposite end is in communication with the interior of a flexible hose 106. At the center of the tube 105 is a short hollow post 114 in open communication with the interior or tube 105 leading to the center of a downwardly directed vacuum cup 115. Thus, vacuum pressure can be transmitted from the hose 106 to the cup 115 by means of tube 105 and post 114.

Fixed to the tube 105 at the end shown at the bottom of FIGURE 7 is a short upwardly protruding bracket 107. The upper end of the bracket 107 is connected to the forward end of a stabilizer rod 108. Rod 108 is pivotally connected at 110 to a bracket 111 on the carriage 71 (FIGURE 16). The rear end of the stabilizer rod 108 is adjustably received within a pivoted sleeve 112 mounted on the bracket 107 and is locked relative to the sleeve 112 by a bolt 113.

The effective length of the lever arms 94 relative to the stub shafts 96 is adjustable by releasing bolts 99 on the mounting blocks 95 and sliding the arms 94 axially relative to the blocks 95 to obtain the desired length rearwardly to the tube 105. The effective length of the stabilizer rod 108 is adjustable by releasing the bolt 113 and sliding the rod 108 relative to the pivoted sleeve 122. The adjustment between the sleeve 112 and rod 108 also permits angular adjustment of the tube 105 and cup 115 relative to the carriage 71 and framework 10. The stibilizer rod 108 provides a parallelogram support for the tube 105 so that the vacuum cup 115 will remain in a fixed angular relationship relative to the supporting framework 10 during pivotal movement of the lever arms 94 relative to the framework 10. The longitudinal adjustment provided between the lever arms 94 and the carriage 71 is again essential in order to provide an apparatus that can be adjusted to accommodate cartons of varying dimensions.

The cross shaft 100 is pivoted by a cylinder assembly 118, best shown in FIGURE 17. The rear end of the cylinder assembly 118 is pivotally carried by a bracket 117 on an extension 119 of carriage 71 (FIGURE 7). The outer end of the piston rod on the cylinder assembly 118 is pivotally connected at 119 to a radially protruding crank arm 116 fastened to the shaft 100. The portion of the crank arm 116 that fastens to the shaft 100 is releasable by means of bolts 120.

*Carton delivery mechanism*

The erected cartons are positioned between two continuously moving sets of belts that frictionally engage the bottom and top surfaces of the carton and maintain them in their expanded condition while moving the cartons longitudinally along the machine. The lower belts are designated by the numeral 121 and can best be seen in FIGURES 6 and 7. The belts 121 are entrained over rear pulleys 122 and front pulleys 125 that are in longitudinal alignment, each pulley in the two pairs being transversely spaced from one another. The rear pulleys 122 are fixed to a short shaft 123 rotatably journalled by bearings 124 on the previously described supports 82 of carriage 71. The front pulleys 125 are fixed to a shaft 126 that extends to one side of the machine (toward the top in FIGURE 7) and which is journalled by a center bearing 127 located between the pulleys 125 and a side bearing 128. Both bearings 127, 128 are mounted in fixed positions on the carriage 71. The front shaft 126 is powered by a motor 130 mounted on the carriage 71 through a transmission 131 having an output sprocket 132. A chain 133 driven by transmission sprocket 132 is wrapped about another sprocket 134 fixed to shaft 126.

The top flights of the lower set of belts 121 have upper surfaces coplanar with the upper surfaces of the longitudinal flanges of carton guides 22 and the top surfaces of the rods 91. Since the collapsed carton blanks fed from the storage hopper will partly rest on the upper flights of belt 121 during erection of the cartons, it is necessary to provide a definite mechanical stop against which each carton blank will be held by frictional engagement of its lower surface by the constantly moving belts 121.

The stop is shown in detail in FIGURE 13. It is simply a rectangular metal stop 135 fixed to the top end of a piston rod of a double acting cylinder assembly 136 mounted on a cross brace 137 fastened between the supports 82 on carriage 71. The cylinder assembly 136 can reciprocate the stop 135 between its raised position as shown in FIGURE 13, where it protrudes inwardly beyond the surfaces of the belt 121 and intersects the path of movement of carton blanks, or a lowered position permitting passage of cartons by frictional engagement of the belt 121.

The carton delivery mechanism also includes a pair of upper belts 138 vertically aligned with the lower belts 121 but spaced above them. The supporting apparatus for the belts 138 is mounted on upright posts 140 fixed to the side members 74 of the movable carriage 71. The upper ends of posts 140 are rigidly connected by an upper rectangular frame 141.

Slidably mounted within the vertically extended portion of carriage 71 formed by posts 140 and frame 141 is a rigid inner frame 142 guided by sliding guides 143 in contact with the respective posts 140 at each side of the machine. The inner frame 142 can therefore move vertically relative to the remainder of carriage 71.

The belts 138 are entrained about rear pulleys 147 on a short rear shaft 146 on rearwardly protruding brackets 144 extending from the inner frame 142 (FIGURE 6). The front pulleys 149 are fixed to a shaft 152 rotatably journalled within a center bearing 150 and a side bearing 151 on forwardly protruding brackets 148. The mounting arrangement for the upper belts 138 is basically identical to that utilized in the mounting of the lower belts 121. The shaft 152 at the front of the upper belt assembly also protrudes to the side parallel to the shaft 126.

Figure 2:
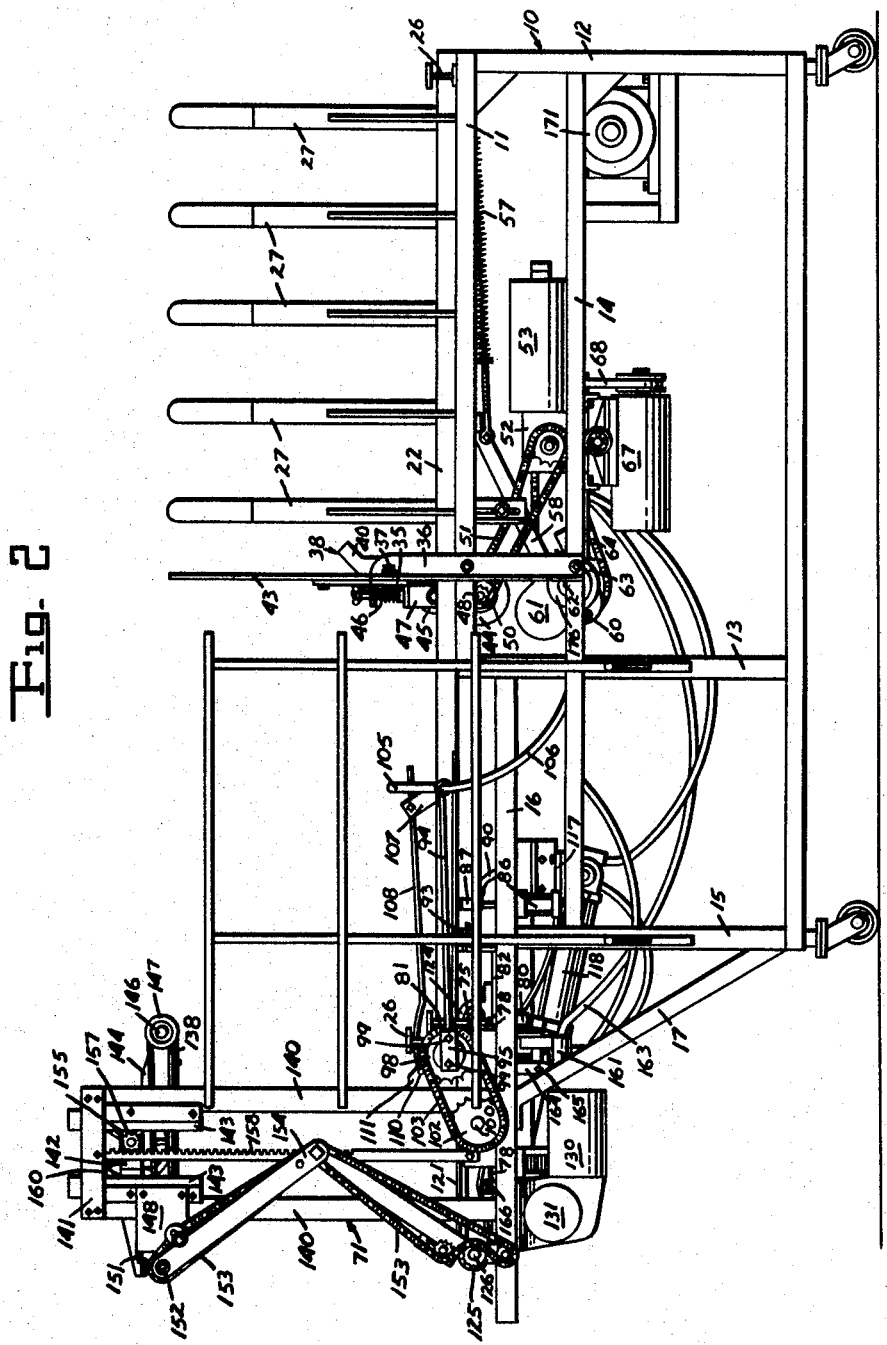
FIGURE 2 is a side elevation view taken opposite to FIGURE 1.

Shaft 126 drives the shaft 152 by means of chains 153 and a mechanical supporting elbow 154 (FIGURE 2). Therefore, the shaft 152 will turn in unison with the shaft 126 and the upper belts 138 will move simultaneously with the lower belts 121. The lower flights of the belts 138 will move forwardly, as will the upper flights of the belts 121.

The inner frame 142 is vertically located relative to the carriage 71 by a cross shaft 155 that is journalled within releasable bearings 156 that can be selectively locked to the cross shaft 155. The bearings 156 (FIGURE 6) are located in fixed positions at each side of the inner frame 142.

At the sides of the machine, the cross shaft 155 has fixed to it a pinion 157 engaged with a vertical rack 158 that extends in a fixed vertical position parallel to the posts 140 (FIGURES 1 and 2). As seen in FIGURE 1, one end of the shaft 155 is provided with a manual wheel 160 which is used to rotate the pinions 157 to cause vertical movement of the inner frame 142 after release of the bearings 156. Subsequent tightening of the bearings 156 to lock the cross shaft 155 will result in the fixing of the elevation of the inner frame 142 at the desired position required to frictionally grip the top and bottom surfaces of a carton by the respective belts 121 and 138.

The vacuum breaker utilized to control vacuum to the cups 88 and 115 is best seen in FIGURE 12. The breaker is designated by the numeral 161 and has a connection to a supply hose 163 as well as the two previously described hoses 90 and 106. A movable cap 162 is utilized to break the vacuum within the vacuum breaker 161. Cap 162 is connected to a lever 164 pivotally connected at 165 to the mounting bracket by which the vacuum breaker 161 is mounted on the carriage 71. A spring 166 extends rearwardly from the lever 164 to the rear transverse brace 73 of carriage 71 and biases the cap 162 to its closed position wherein the vacuum pressure will remain intact.

At its upper end, lever 164 is provided with an adjustable contact bolt 167 that is adapted to be selectively engaged by a bracket 168 fixed to the shaft 100. The angular position of bracket 168 is such that it will contact the bolt 167 when the lever arms 94 reach their uppermost position, thereby releasing the vacuum at cups 88 and 115 just as the carton is fed between the belts 121 and 138. At all other times, vacuum will be maintained in the hoses 90, 106.

The supply hose 163 can be connected to any suitable source of vacuum pressure, a vacuum pump 170 being shown on the framework 10 together with a motor 171. However, the source of vacuum pressure need not be mounted on the machine if a suitable source of vacuum is available for use.

The operation of the cylinder assembly 118, which controls the lever arms 94, is controlled directly from the main cross shaft 62. The control mechanisms are illustrated in detail in FIGURES 8 through 10. FIGURES 8 through 10 show the controls utilized to actuate pneumatic cylinder assembly 118. These controls are operated in a timed relation with the storage and feeding mechanism by units controlled directly from the cross shaft 62. Fixed to the cross shaft 62 is a first disc 172 (FIGURE 8) having a cam element 171 that selectively engages the switch arm 174 of a small switch 173 fixed to the frame 10. The switch 173 is wired to a solenoid valve and, when actuated by contact with cam 171, operates the valve to cause the cylinder assembly 118 to push outwardly on the piston rod connected to crank arm 116, causing lever arms 94 to be lowered toward framework 10. As shown in FIGURE 10, the timing of cam 171 relative to the previously described cam 61 is such that the switch 173 will be actuated just as the cam 61 has reversed the forward motion of plate 53 relative to the framework 10.

A similar cam 175 fixed to a disc 176 is also rotated in unison with the cross shaft 62. The cam 175 is displaced slightly less than 180° from cam 171 in the direction of rotation of shaft 62. Cam 175 is situated so as to trip a switch arm 178 of a second switch 177. The switch 177 is wired to the previously described solenoid valve for cylinder assembly 118. When actuated, switch 177 reverses the condition of the valve to cause the cylinder assembly 118 to contract, pulling crank arm 116 toward the cylinder assembly 118 and raising the lever arms 94. As is evident from FIGURES 9 and 10, the lowering and raising of the lever arms 94 will occur during a slightly less than one-half revolution of shaft 62. During this time, the member 54 will be preparing to feed another carton blank.

Figure 11:
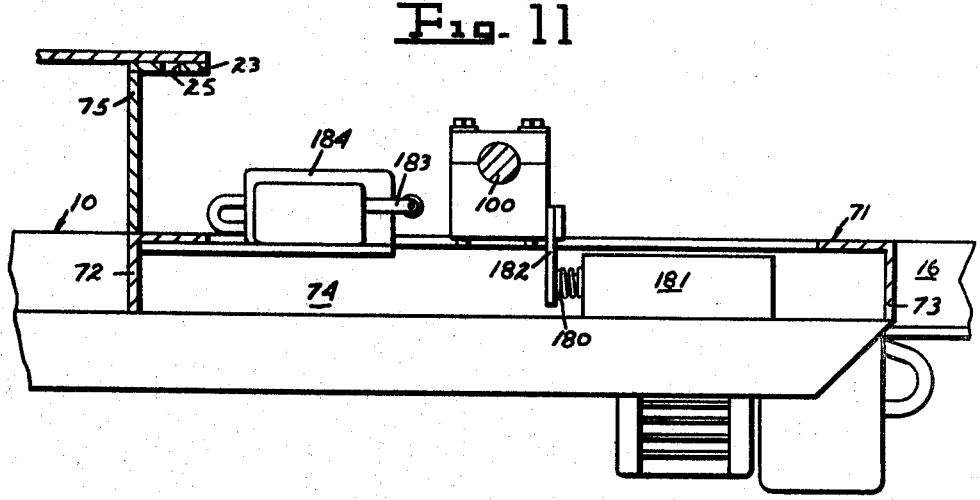
FIGURE 11 is an enlarged fragmentary sectional view taken along line 11—11 in FIGURE 7.

The cylinders 86 and 136 are controlled by switch operated valves, best seen in FIGURE 11. The switches for these cylinders are operated directly from the cross shaft 100, which is pivoted by actuation of cylinder assembly 118.

A solenoid controlled valve 181 for the single acting cylinder 86 is mounted on the carriage 71. It includes a switch actuator 180 positioned so as to be contacted by a bracket 182 fixed to shaft 100 when the lever arms 94 have reached their lowermost position relative to frame 10 (FIGURE 11). The valve 181 normally leaves the single acting cylinder 86 in a condition to be retracted, and raises the piston rod and post 87 only when the actuater 180 is engaged. However, this will occur only when vacuum pressure is supplied to the cup 88. The clamping of cup 88 to a carton panel by the vacuum pressure will retain the cup 88 in contact with the carton. The post 87 will therefore remain in its upper position until the vacuum pressure is released.

There are two switches to control the double acting cylinder 136 that raises or lowers the vertical stop 135. The condition of the solenoid controlled valve is reversed by actuation of either of two switches. The first is a switch 184 (FIGURE 11) having a switch arm 183 adapted to be contacted by the previously described bracket 182 on shaft 100. The switch 184, when contacted by bracket 182, will cause the solenoid controlled valve to lower stop 135.

The second switch, which is interconnected with switch 184, is located in a fixed position on carriage 71 directly forward of stop 135 and is designated by the numeral 185. It includes an actuator element 186, the top surface of which is biased to a position just slightly above the upper surface of the upper flights of belts 121. Actuator element 186 will be depressed by passage of a carton above it, retaining the stop 135 in its lowered position. When element 186 is released, it reverses the valve for cylinder 136, raising stop 135. The purpose of switch 185 is to prevent the stop 135 from coming upwardly against a moving carton passing over it, the position of the actuator 186 near stop 135 ensuring rapid recovery of stop 135 immediately after passage of a carton beyond actuator 186.

*Operation of the machine*

The basic operation of the machine is believed to be evident from the foregoing description. However, to briefly describe one complete cycle of the machine, one must begin with the feeding of a carton blank from the storage hopper and proceed through its expansion and final delivery by belts 121 and 138. FIGURES 17 and 18 schematically illustrate the basic steps involved in a complete machine cycle, although reference to other figures is necessary in order to comprehend some of the details.

In FIGURE 17, the carton blanks in the storage hopper are designated by the numeral 187. Each blank 187 has four sides, the side edges of the carton being provided with flaps that will later be closed to complete an enclosed carton. However, that is not the purpose of the instant machine, which is designed to set up the cartons in a high speed operation with both ends open, delivering the cartons to another machine for further operations.

A complete operation on a single carton blank 187 begins with reciprocation of the tapered member 54 toward the front of the machine. This is caused by the continuous rotation of the cross shaft 62, which will result in cam 61 pulling forwardly on the connecting link 58, as can be visualized from FIGURE 17. The forward movement of the member 54 will cause the lowermost carton blank 187 to be engaged at its rear edge by the ledge 55, thereby pushing this carton beneath the forward upright 43, which prevents forward movement of all but the lowermost of the cartons. The carton blank 187 will pass beneath the vertical wall 35 and be frictionally engaged by the opposed rolls 44, 45.

The rolls 44 and 45 propel the carton blank 187 forwardly into contact with the stop 135, which will be raised immediately after the switch actuator 186 has been cleared by the preceding carton. The timing of the feed mechanism is such that a carton blank 187 will not be moved into contact with the stop 135 prior to its being raised, but the timing can be very close so that no time is wasted. The powered roll 44 is independently driven by motor 53 and transmission 52, which can be varied in speed to propel carton blanks 187 to the stop 135 with sufficient force to ensure their proper positioning regardless of the size of the carton and the distance beyond rolls 44, 45 that the carton must be moved. The speed imparted to a carton blank 187 by rolls 44, 45 should be greater than that imparted by reciprocation of the member 54.

Following contact of the carton blank 187 by rolls 44, 45, the member 54 performs no further function, and is simply reversed and moved rearwardly by continued rotation of the cam 61, to await contact with the next carton blank 187.

The carton blank 187 propelled forwardly by the rolls 44, 45 will be accurately located relative to the framework 10 by the combination of the longitudinal carton guides 22 along each side of the carton, the raised stop 135, and the adjustable tapered stops 70 on the longitudinal carton guides. The latter are located so as to contact the rear edge of the carton blank 187 when in position at the station at which it is to be erected.

As previously described, the switch arm 174 for switch 173 will be actuated by cam 171 just as the member 54 begins its motion. At this time, the carton blank 187 will have come to rest against the raised stop 135. Actuation of switch 173 will cause the lever arms 94 to be lowered by pivotal movement of cross shaft 100. Upon initial pivotal movement of cross shaft 100, the switch arm 183 will be released, but stop 135 will remain in its raised position due to release of element 186. Continued pivotal movement of the cross shaft 100 will cause the upper vacuum cup 115 to contact the carton blank 187 as shown in full lines in FIGURE 17. This is the position at which the drawings were illustrated. In this condition, the switch actuator 180 for the solenoid controlled valve 181 will be contacted by the bracket 182 (FIGURE 11). This causes the cylinder 86 to raise the lower vacuum cup 88 into contact with the bottom panel of the carton blank 187. The preferred point of contact of the upper cup 115 is adjacent to the forward corner of the upper carton panel as can be seen in the dashed line showing of FIGURE 17.

After contact of the carton blank 187 is made by the two vacuum cups 88 and 115, the continued rotation of the cross shaft 62 will cause the cam 175 to contact the switch arm 178 for switch 177. This will reverse the air pressure directed to the double acting cylinder assembly 118, causing crank arm 116 to rotate the cross shaft 100 in a clockwise direction as seen in FIGURE 17. Clockwise pivotal movement of the cross shaft 100 raises the lever arms 94, causing the carton blank 187 to be expanded. The first consequence of this reversal is the release of the switch actuator 180 (FIGURE 11), which would permit retraction of the cylinder assembly 86 except for the continued vacuum pressure supplied to cup 88. This vacuum pressure will retain the clamping action of cup 88 against the bottom surface of the carton blank 187.

Continued upward movement of the lever arms 94 beyond the position shown in dashed lines in FIGURE 17 results in the cup 115 being pulled between the upper belts 138 until the top and bottom carton surfaces are frictionally contacted by the belts 138 and 121 respectively. When the lever arms 94 pull the top and bottom carton panels into frictional contact with the belts 138 and 121, the vacuum pressure at cups 88 and 115 will be broken by operation of the bracket 168 on cross shaft 100 (FIGURE 12). This will permit the lower vacuum cup 88 to drop and the upper vacuum cup 115 will move just slightly higher than the lower surface of the belts 138

(FIGURE 18). At the same instant, the switch arm 183 will be contacted by the bracket 182 (FIGURE 11), and will cause the cylinder assembly 136 to quickly retract the stop arm 135. The carton blank 187 will then be propelled between the constantly moving belts 121 and 138 and will be ejected from the machine to the right as shown in FIGURE 18. The arms 94 will remain in their upper position until they again begin their downward movement when the cam 171 again trips the arm 174 of switch 173.

Stop 135 cannot be raised so long as any part of the carton blank 187 being moved by belts 121 and 138 is in contact with the actuator 186 of the switch 185. Immediately after passage of the expanded carton 187 past the actuator 186, stop 135 will be raised in adequate time to locate the next carton blank 187 fed from the hopper by the rolls 44 and 45. The timing of these various mechanisms is extremely critical and can be adjusted so as to eliminate all waste motion, each carton blank being set up immediately after being fed from the hopper.

The entire apparatus is adjustable so that it can accommodate a carton blank of any desired dimension. The various vacuum cups can be spaced relative to the movable carriage 71 to accommodate carton panels of any dimension. The speed of the powered roll 44 can be varied to propel the carton blanks into contact with the raised stop 135. The vertical separation between belts 121 and 138 can be varied to ensure proper frictional engagement with the expanded cartons. All of the various adjustments are believed to have been adequately described in the body of this specification with relation to the specific structures.

It is to be understood that various equivalent devices could be used, particularly in the apparatus that feeds carton blanks from the storage hopper. The feeding of the carton blanks can be made more positive by utilizing a suction feed device to positively pull cartons downwardly from the stack, which makes possible the use of even greater speed in the mechanism. Other control and actuating devices might also be used.

Since minor changes can be made in the specific details of the structure described above, only the following claims are intended to limit or restrict the scope of my invention.

Having thus described my invention, I claim:

1. A machine for setting up open ended cartons, comprising:
   a supporting framework;
   carton blank storage means on said framework to hold a stack of collapsed carton blanks;
   carton blank feed means on said framework to selectively move individual collapsed carton blanks from said carton blank storage means to a station on said framework spaced therefrom;
   carton blank supporting means on said framework at said station to contact and locate each carton relative to said framework;
   carton erection means on said framework to grasp opposite panels of each carton blank so located and to expand each carton to a rectangular configuration;
   and carton delivery means on said framework to frictionally engage said opposite carton panels of an expanded carton and carry each carton so engaged from the station at which it was expanded.

2. A machine as defined in claim 1 wherein said carton delivery means comprises first and second spaced belts having parallel flights thereof facing one another and spaced on said framework a distance equal to the separation between the outer surfaces of said opposite carton panels after expansion.

3. A machine defined in claim 1 wherein said carton delivery means comprises first and second spaced belts having parallel flights thereof facing one another and spaced on said framework a distance equal to the separation between the outer surfaces of said opposite carton panels after expansion;
   said carton supporting means comprising:
      a plurality of supporting surfaces fixed to said framework parallel to and slightly outward from the inner surface of one of said belt flights;
      carton blank aligning means on said framework to contact the respective side edges of a collapsed carton blank, said carton blank aligning means being parallel to said belts;
      and movable stop means on said framework located between said carton blank aligning means and intermediate the longitudinal ends of said one belt flight, said movable stop means being shiftable relative to said framework between a first position protruding inwardly beyond said one belt flight toward the remaining belt and a second position located outward of said one belt flight.

4. A machine for setting up open ended cartons, comprising:
   a supporting framework;
   carton blank storage means on said framework to hold a stack of collapsed carton blanks;
   carton blank feed means on said framework to selectively move individual collapsed carton blanks from said carton blank storage means to a station on said framework spaced therefrom;
   carton blank guide means fixed to said framework to contact and support the side edges of a carton blank moved by said carton blank feed means;
   a movable stop carried on said frame located between said carton blank guide means, said stop being movable from a first position obstructing motion of a carton blank supported by said carton blank guide means to a second position clear of such blank;
   carton blank erecting means on said framework to grasp opposite panels of each carton blank when in contact with said stop at said station and to expand the carton to a rectangular configuration;
   and a pair of delivery belts mounted on said framework having inwardly facing flights parallel to one another and spaced so as to frictionally receive said opposite panels of each expanded carton, said stop being located on said framework intermediate the longitudinal ends of said belt flights.

5. A machine as defined in claim 4, further comprising:
   a main control shaft on said framework;
   powered means operatively connecting said shaft and said carton blank feed means to periodically move carton blanks from said carton blank storage means;
   and first control means on said framework and shaft operatively connected to said carton blank erecting means to expand individual cartons in a timed relation to the operation of said carton blank feed means.

6. A machine as defined in claim 4, further comprising:
   a main control shaft on said framework;
   powered means operatively connected to said shaft to rotate said shaft about its longitudinal central axis;
   means operatively connecting said shaft and said carton blank feed means to periodically move carton blanks from said carton blank storage means;
   first control means on said framework and shaft operatively connected to said carton blank erecting means to expand individual cartons in a timed relation to the operation of said carton blank feed means;
   and second control means on said carton blank erecting means and framework operatively connected to said movable stop to shift said stop from said first position to said second position when said carton expanding means has caused a carton blank to attain its rectangular configuration.

7. A machine as defined in claim 4 wherein said carton blank erecting means comprises:
   first movable vacuum cup means mounted on said framework for motion between a first position in contact with the one of said opposite panels supported by said carton blank guide means and a second position clear of the carton;

and second movable vacuum cup means mounted on said framework for pivotal motion between a first position in contact with the remaining one of said opposite panels of a collapsed carton blank and a second position spaced apart from said first vacuum cup means a distance equal to the expanded carton outer dimension between said opposite panels.

8. A machine as defined in claim 4 wherein said carton expanding means comprises:

a first movable vacuum cup mounted on said framework for motion between a first position in contact with the one of said opposite panels supported by said carton blank guide means and a second position clear of the carton;

a second movable vacuum cup movably mounted on said framework for pivotal motion between a first position in contact with the remaining one of said opposite panels of a collapsed carton blank and a second position spaced apart from said first vacuum cup a distance equal to the expanded carton outer dimension between said opposite panels;

a common source of vacuum pressure operatively connected to said first and second vacuum cups;

and vacuum breaker means interposed between said source of vacuum pressure and said cups to release the vacuum pressure supplied at said cups when said second vacuum cup has attained its second position.

9. A machine as defined in claim 8 wherein said second vacuum cup is carried by a lever mechanism pivotally mounted on said framework for rotation about a fixed axis;

means operatively connected between said second vacuum cup and said framework to maintain said vacuum cup in a constant angular relation relative to the framework;

powered means on said framework operatively connected to said first vacuum cup to selectively shift said first vacuum cup between its first and second positions;

and control means on said framework operatively connected to said lever mechanism and to said powered means to actuate said powered means to shift said first vacuum cup to said first position when said second vacuum cup attains its first position.

10. A machine as defined in claim 8 wherein said second vacuum cup is carried by a lever mechanism pivotally mounted on said framework for rotation about a fixed axis;

means operatively connected between said second vacuum cup and said framework to maintain said vacuum cup in a constant angular relation relative to the framework;

powered means on said framework operatively connected to said first vacuum cup to selectively shift said first vacuum cup between its first and second positions;

control means on said framework operatively connected to said lever mechanism and to said power means to actuate said powered means to shift said first vacuum cup to said first position when said second vacuum cup attains its first position;

second powered means on said framework operatively connected to said lever mechanism to move said second vacuum cup between said first and second positions;

a main control shaft on the framework;

third powered means operatively connected to said control shaft to rotate said shaft about its longitudinal central axis;

means operatively connecting said control shaft and said carton blank feed means to periodically move carton blanks from said carton blank storage means;

and second control means on said framework and said control shaft operatively connected to said second powered means to move said second vacuum cup between its first and second positions in a timed relation to the operation of said carton blank feed means.

11. A machine as defined in claim 8 wherein said second vacuum cup is carried by a lever mechanism pivotally mounted on said framework for rotation about a fixed axis;

means operatively connected between said second vacuum cup and said framework to maintain said vacuum cup in a constant angular relation relative to the framework;

powered means on said framework operatively connected to said first vacuum cup to selectively shift said first vacuum cup between its first and second positions;

control means on said framework operatively connected to said lever mechanism and to said power means to actuate said powered means to shift said first vacuum cup to said first position when said second vacuum cup attains its first position;

second powered means on said framework operatively connected to said lever mechanism to move said second vacuum cup between said first and second positions;

a main control shaft on the framework;

third powered means operatively connected to said control shaft to rotate said shaft about its longitudinal central axis;

means operatively connecting said control shaft and said carton blank feed means to periodically move carton blanks from said carton blank storage means;

second control means on said framework and said control shaft operatively connected to said second powered means to move said second vacuum cup between its first and second positions in a timed relation to the operation of said carton blank feed means;

and third control means operatively connected to said lever mechanism and to said movable stop to shift said movable stop to its second position upon said second vacuum cup attaining its second position.

References Cited

UNITED STATES PATENTS

| | | | |
|---|---|---|---|
| 2,750,856 | 6/1956 | Ferguson et al. | 93—53 |
| 3,097,463 | 7/1963 | Neal et al. | 93—53 X |
| 3,217,463 | 11/1965 | Stannard et al. | 93—53 X |

BERNARD STICKNEY, *Primary Examiner.*